United States Patent
Petrea et al.

(10) Patent No.: US 6,857,225 B2
(45) Date of Patent: *Feb. 22, 2005

(54) METHOD OF TREATING SANDY SOILS WITH MULTI-BRANCHED REGENERATING WETTING AGENTS

(75) Inventors: Randy D. Petrea, Spartanburg, SC (US); Christopher Byrd, Moore, SC (US); Shirley Anne Whiteside, Chesnee, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/461,799

(22) Filed: Jun. 13, 2003

(65) Prior Publication Data

US 2004/0261314 A1 Dec. 30, 2004

(51) Int. Cl.⁷ .................................................. A01G 1/04
(52) U.S. Cl. .................................................. 47/58.1 SC
(58) Field of Search ....................... 47/58.1 SC, 58.1 R, 47/1.01

(56) References Cited

U.S. PATENT DOCUMENTS

| | | | | |
|---|---|---|---|---|
| 5,580,841 A | * | 12/1996 | Chan et al. | 504/206 |
| 5,595,957 A | | 1/1997 | Bowey et al. | 504/118 |
| 5,731,268 A | | 3/1998 | Taguchi et al. | 504/351 |
| 5,921,023 A | | 7/1999 | Ogawa et al. | 47/58.1 |
| 6,079,153 A | * | 6/2000 | Templeton | 47/59 R |
| 6,090,896 A | * | 7/2000 | Jahnke et al. | 525/404 |
| 6,326,187 B1 | * | 12/2001 | Jones et al. | 435/262.5 |
| 6,350,788 B1 | * | 2/2002 | Herold et al. | 516/204 |
| 6,481,153 B1 | * | 11/2002 | Petrea et al. | 47/1.01 R |
| 6,591,548 B2 | * | 7/2003 | Petrea et al. | 47/58.1 SC |
| 6,675,529 B1 | * | 1/2004 | Petrea et al. | 47/58.1 SC |
| 2003/0115793 A1 | * | 6/2003 | Kostka et al. | 47/58.1 SC |

FOREIGN PATENT DOCUMENTS

WO    WO 01/26832    4/2001

* cited by examiner

*Primary Examiner*—Teri P. Luu
*Assistant Examiner*—Susan C. Alimenti
(74) *Attorney, Agent, or Firm*—Terry T. Moyer; Brenda D. Wentz

(57) ABSTRACT

Certain novel formulations of turf additives that act in such a manner as to permit proper amounts of moisture to contact root systems in order to reduce dry spots within highly managed turf areas and/or lawns. The inventive formulation comprising multi-branched surfactant compounds with both hydrophobic and hydrophilic constituents within each branch attached to an oxygen-containing polyfunctional base compound permits effective moisture penetration through such localized dry spots for sustained grass growth therein. Importantly, such multi-branched wetting agents provide sustained moisture penetration over a sustained period of time since the individual branches of such compounds may become dissociated from its base polyfunctional compound. Since such branches include both hydrophobic and hydrophilic constituents themselves, and thus act as wetting agents, even after degradation of the initial surfactant compound, long-term wetting and moisture penetration, at least, are permitted. Methods of treating sandy soils with such compounds and formulations thereof are also contemplated within this invention.

11 Claims, No Drawings

METHOD OF TREATING SANDY SOILS WITH MULTI-BRANCHED REGENERATING WETTING AGENTS

FIELD OF THE INVENTION

This invention relates to certain novel formulations of turf additives that act in such a manner as to permit proper amounts of moisture to contact root systems in order to reduce dry spots within highly managed turf areas and/or lawns. The inventive formulation comprising multi-branched surfactant compounds with both hydrophobic and hydrophilic constituents within each branch attached to an oxygen-containing polyfunctional base compound permits effective moisture penetration through such localized dry spots for sustained grass growth therein. Importantly, such multi-branched wetting agents provide sustained moisture penetration over a sustained period of time since the individual branches of such compounds may become dissociated from its base polyfunctional compound. Since such branches include both hydrophobic and hydrophilic constituents themselves, and thus act as wetting agents, even after degradation of the initial surfactant compound, long-term wetting and moisture penetration, at least, are permitted. Methods of treating sandy soils with such compounds and formulations thereof are also contemplated within this invention.

BACKGROUND OF THE PRIOR ART

Water repellent soil, whether in sandy areas or not, have proven to be the most difficult conditions in which plant life may be grown. Such a condition basically prevents or drastically reduces the ability of water to infiltrate from the ground level to subterranean root systems. In addition, environmental problems may occur as well due to surface runoff from rain, thereby transporting pesticides and/or fertilizers from the desired agriculture locations to ponds, lakes, reservoirs, or other undesirable water sources, as well as increasing the chances of ground water contamination therefrom.

Water content and soil particle size contribute to such water repellency issues, in addition to the presence of certain organic matter therein (humic acid, for example, as discussed in greater detail below). Such organic matter basically causes water repellency in the specific soils by imparting hydrophobic properties thereto while adhering to the soil particles themselves via hydrophilic constituents present within the particular organic matter.

In particular, localized dry spots are a distinct problem within highly managed turf areas and/or lawns, in particular those with sandy soils, primarily for aesthetic reasons. Such dry spots are the result of the development of areas of varying degrees of water repellency within and at the surface of the target soil. Plant water usage is critical to sustained plant growth; however, the existence of such localized dry spots creates a problem with nonuniformity of water supply to treated grasses over time. Basically, in times of high stress and/or easy water evaporation (e.g., higher temperatures, low humidity), such water repellency areas will exhibit higher water loss than others. As a result, the plant life present within the target lawn or green will not receive uniform, and, at times, vastly different levels of, water supply. As time passes, the difference in the amount of water supplied to discrete areas of the target lawn or green may become more disparate. Thus, the possibility for localized dry spots to materialize within sandy soils is relatively high over a sustained length of time (e.g., from 6 to 18 months on average from genesis to being empirically noticed), and, again, most times the existence of such dry spots is unknown to the lawn or green caretaker until materialization (since the presence of such water repellency areas may exist anywhere within the topsoil, from the surface to as low as about 2 inches below, the area of greatest concentration of grass root systems).

Also, hydrophobicity of sand creates certain problems with regard to pooling water after raining (as one example) which in turn causes unsightly areas either within highly sandy yards, ballparks, or beaches, or to provide water penetration in dry sandy conditions in order to possibly sustain plant-life therein (such as arid desert-like areas). Reduction in such water repellency would thus be helpful in maintaining, at least, better aesthetics for such sandy areas, as well as the possibility for permitting or promoting the growth of sustained plant life in such dry, barren areas.

Without intending to be bound to any particular scientific theory, it is believed that such water repellency areas within sandy soils are the result of the presence of humic substances and their attachment to soil components, particularly in large accumulations at the topsoil surface. Humus is degraded plant and animal matter (by microbial organisms) and is basically the organic portion of soil that comprises the necessary nutrients to sustain plant growth and life therein. One byproduct of such humus (again produced through a naturally occurring process within the soil) is humic acid (simply the acidic form of humus, basically a mix of various different materials). Humic acid and other like substances, although necessary for the sustenance of plant life as it provides the aforementioned nutrients to root systems, unfortunately also appears to create problems within sandy soils, most particularly the creation of a waxy organic, water-repellent coating upon binding to and with soil components (for instance, and without limitation, sand). If such a coating is permitted to accumulate over a long period of time, such as the aforementioned 6 to 18 month period, and particularly at the topsoil surface, the coating becomes highly water repellent in nature and uniform plant water use is difficult to achieve. In theory, and, again, without intending to be bound to such theory, it is believed that such a coating is formed by the amphiphylic humic acid (or other like humic substance) adhering, by its hydrophilic portion, to the hydrophilic sites within the sandy soil, permitting the highly hydrophobic ends to extend (similar in nature to a micelle). Such a coating is thus hydrophobic in nature and, when present as a thorough coating over such surface portions, again, tends to either drive water away or facilitate water loss by preventing moisture from passing through to the subterranean roots of any plants therein. If the water remains at the surface, evaporation is also facilitated as such moisture cannot easily penetrate the hydrohphobic soil surface. Such a problem exists, as noted above, not only within greens, but also within lawns and pastures (as merely some examples of such trouble areas). In order to provide a uniform appearance in lawns and greens, it has been a requirement either to water consistently in very large amounts (which is wasteful and possibly damaging to the plants themselves) or to water selected trouble areas by hand on a continuous basis (which is labor-intensive and possibly wasteful in terms of water consumption). Furthermore, it is generally too late to know of problematic water repellent areas within such lawns or greens until they become apparent empirically. For pastures, pools of water develop sporadically on occasion due to this problem; the standard method of remedying this problem is to dig up the earth and wait for the humic substances to be consumed as nutrients (over a relatively long period of time) by the root systems therein. Such a procedure thus leaves an aesthetically displeasing result and is not always reliable for reducing water repellency therein. Thus, it has been found that there exists a need to provide a simple method for providing effective moisture penetration through such highly hydrophobic coatings to ameliorate the lack of hydrophilicity, and thus water availability at the soil surface and within the subterranean root systems thereof without causing detrimental effects to the surface plant life.

In the past, the best methods of reducing the amount and presence of localized dry spots have basically involved the introduction of certain standard surfactants to the soil for the transport of water through the surface coating, preferably in tandem with compounds that decrease the surface tension of the waxy coating to permit penetration of the active surfactant components themselves in U.S. Pat. No. 5,921,023 to Ogawa et al., U.S. Pat. No. 5,595,957 to Bowey et al., and U.S. Pat. No. 5,731,268 to Taguchi et al. Such a method has been problematic to a certain extent due to the cost associated with some silicon-based surfactants, biodegradability issues of most viable surfactants, as well as foaming problems when water is present, and/or the difficulty in removal of degraded coating components after surfactant treatment. Also, this specific surfactant-only treatment does not remove the waxy coating to an appreciable degree from the target topsoil surface. Furthermore, prior surfactant treatments are limited in effectiveness due to the need for continued application thereof to target soils over a relatively short period of time for any sustained improvements in moisture penetration. A long-term (e.g., greater than 4 months, or a season) formulation applied in a single application or in split applications spaced 7 to 10 days apart and/or method for providing water repellency improvements are thus unavailable to the pertinent industry at this time.

Another manner of reducing such dry spot problems has been increasing watering itself. However, as noted above, such a method is labor intensive and, in many areas where water is not plentiful, use for aesthetic purposes (e.g., lawns, greens, and the like), is preferably kept at a minimum as compared to other more important purposes (e.g., drinking water). Such an issue also contributes to the aforementioned development of water repellency areas over long periods of time because of the inability of the caretaker to continuously supply moisture to target lawns, greens, etc., to the levels needed to best ensure uniformity of watering is accomplished. Other possible attempts at alleviating such a problem exist, albeit as an aim at removing contaminants (e.g., oils, fuels, etc.) from the target soils for improving plant growth therein (U.S. Pat. No. 6,090,896 to Jahnke et al. and WO01/26832 to Lubrizol Corporation). None of these procedures provide the necessary degree of wetting at the lower cost and/or labor intensity to overcome the hydrophobicity problems noted above. Wetter formulations applied in a single application or in split applications spaced 7 to 10 days apart to provide wetting methods for season-long consistent and continuous moisture penetration within such hydrophobic soils are nonexistent currently. Such a currently unavailable method and formulation providing such beneficial results are thus highly desirable to the soil treatment industry.

DESCRIPTION OF THE INVENTION

It is thus an object of the invention to provide an improved application method of applying a wetting formulation in a single application or split into two applications spaced 7 to 10 days apart of lowering topsoil surface tension by providing effective wetting through the hydrophobic portion of humic acid coatings, thereby permitting moisture to penetrate such a coating and pass to the root systems of target plants therein. A simple, safe formulation permitting such a method is also an object of this invention.

Accordingly, this invention concerns a soil additive formulation and/or method of treating sandy areas, soils, or areas including both sand and soil (such as lawns, greens, pastures, beaches, dry desert-like areas, and the like), wherein said soil additive formulation comprises a multi-branched oxygen-containing polyfunctional compound-based surfactant exhibiting both hydrophilic and hydrophobic constituents within each branch thereof, and wherein such compound comprises at least three, preferably, five or greater, such branches thereon, and from 0.1–99% (could be 0–90%) by weight of at least one other compound that further actively lowers the surface tension of humic acid waxy coatings from hydrophobic sand particles. Such a formulation may also comprise a copolymer exhibiting both hydrophilic and hydrophobic portions for reaction with the hydrophobic portions of such hydrophobic sand particles in order to further provide hydrophilic extensions therefrom to facilitate topsoil surface tension reductions for effective moisture penetration. Lastly, a method for reducing localized dry spot formation within lawns or greens by providing long-term wetting via single-application (and/or split applications spaced 7 to 10 days apart) formulations and treatments comprising the application of a soil additive formulation to a target lawn or green, wherein said soil additive formulation comprises the same multi-branched surfactant compound as noted above. Again, to date, nothing within the pertinent prior art teaches or fairly suggests such specific inventions.

Such a composition and method of treating sandy areas may thus be utilized for the provision of moisture penetration benefits in sandy areas alone. In such a manner, the sandy area (a beach, for example) may be modified to permit water penetration therein, to prevent unsightly water pools, for example, after raining, or to dry desert-like areas in order to permit water penetration to sustain root systems of plant-life which would not grow otherwise.

The inventive formulation may either be applied in liquid form, pellet form, or granular form to the selected treated area.

The inventive formulation, in terms of composition, thus requires at least one multi-branched oxygen-containing polyfunctional compound-based wetting agent. Such a polyfunctional compound may be a polyol, polycarboxylic acid, or lactone (the ring structure of which will open upon reaction to provide the necessary reactive sites for surfactant addition thereto), wherein the moieties include highly reactive end groups for reaction with surfactant-like groups to form the desired branches therein. In such a base compound, the oxygen-containing functionalities (oxygen alone, or as part of a carboxylic acid group) provide the reactive sites and thus act as linking groups between the base compound and the surfactant-like branches. The term polyol, for this invention, basically covers any compound with at least three hydroxyl moieties thereon; likewise; polycarboxylic acid encompasses compounds having at least three such acid moieties present thereon; and lactone is a heterocyclic compound with at least two oxygens therein. Thus, particular classes of polyols suitable for this purpose include, without limitation, tri- to octa-hydric alcohols such as pentaerythritol, diglycerol, α-methylglucoside, sorbitol, xylitol, mannitol, erythritol, dipentaerythritol, arabitol, glucose, sucrose, maltose, fructose, mannose, saccharose, galactose, leucrose, and other alditol or sugar molecules, polybutadiene polyols, castor oil-derived polyols; hydroxyalkyl methacrylate copolymers, hydroxylalkyl acrylate polymers, polyvinyl alcohols, glycerine, glycerol (a/k/a glycerine), 1,1,1-trimethylolpropane; 1,1,1-trimethylolethane; 1,2,6-hexanetriol, and butanetriol; polycarboxylic acids, such as tartaric acid, citric acid, ascorbic acid, 2-phosphono-1,2,4-butane tricarboxylic acid, glucuronic acid, ethylenediaminetetraacetic acid, gluconic acid, cyclohexane hexacarboxylic acid, mellitic acid, saccharic acid, mucic acid, diethylenetrimine pentaacetic acid, glucoheptonic acid, lactobionic acid, 3,3',4,4'-benzophenone tetracarboxylic acid, amino propyl trimethoxysilane, aminopropyltriethoxysilane, 3-glycidoxypropyltrimethoxy silane, 3-glycidoxypropyltriethoxysilane, 3-(triethoxysilyl) propyl isocyanate, 3-(trimethoxysilyl)propyl isocyanate, glucose, leucrose, diaminopropane-N,N,N',N'-tetraacetic acid, aconitic acid, isocitric acid, 1,2,3,4-butanetetracarboxylic acid, nitrilotriacetic acid, tricarballylic acid, N-(phosphonomethyl)iminodiacetic acid, 3-[[tris (hydroxymethyl)methyl]amino]-1-propanesulfonic acid, 2-[[tris(hydroxymethyl)methyl]amino]-1-ethanesulfonic acid, 3-[bis(2-hydroxyethyl)amino]-2-hydroxy-1-propanesulfonic acid, 3-[N-trishydroxymethylmethylamino]-2-hydroxypropanesulfonic acid, N-tris[hydroxymethyl]methyl-4-aminobutanesulfonic acid, 3-aminoadipic acid, aspartic acid, α-glutamic acid, β-glutamic acid, 1,3-diamino-2-hydroxypropane-N,N,N',N'-tetraacetic acid, triethylenetetraaminehexaacetic acid, β-carboxyaspartic acid, α-hydroxymethylaspartic acid, tricine, 1,2,3,4-cyclopentanetetracarboxylic acid, and 6-phosphogluconic acid; and lactones, such as glucoheptonic lactone and glucooctanoic-γ-lactone, all as merely non-limiting examples of such a base compound. Preferred are the alditol types (in particular, sorbitol) as well as glycerol.

The required wetting agents thus include the reaction of surfactant-type compounds (exhibit both hydrophobic and hydrophilic moieties) to the reactive (or functional) sites of the polyfunctional base compound. Thus, the wetting agent initially exists as a single compound (having both hydrophobic and hydrophilic moieties within each branch, and thus within the entire compound), and subsequently, after application to target soils, will degrade into separate, individual surfactants free from the polyfunctional base compound. The wetting agent thus exhibits excellent ability to provide the necessary water adhesion to the hydrophobic surface of the water repellent soil via the hydrophobic groups of the surfactant itself with the hydrophilic groups free to provide the beneficial wetting characteristics, and, even upon such above-noted degradation, will still exhibit continued, effective wetting, and thus water transport, through the hydrophobic soil. Any adhered water droplets will be pulled into the sand and/or soil by further adhesion by other particles or through cohesion with other water droplets. Thus, such a wetting agent effectively permits appreciable and necessary amounts of moisture to penetrate the topsoil for beneficial moisture supply to the subterranean roots on a consistent and continuous basis for a relatively long period of time. As noted previously, the multi-branched aspect of this compound pemlits degradation of the compound without losing any appreciable ability to provide continued wetting characteristics within the targeted soils. Thus, in the long-term formulation, a single application or a split application spaced 7 to 10 days apart, accords consistent, at least effective, wetting, and moisture penetration without any need for further labor-intensive and possibly costly applications of treatment formulations.

Such a wetting agent may be of any type as broadly described above, that provides the above-discussed water movement through function of the multi-branched structure. Preferably, and without limitation, such a wetting agent may be chosen from the class of compounds that are alditol-based (as the most preferred type of polyfunctional compound base), thus having five or more free oxygens for reaction with surfactant-type constituents to form the desired multiple branches thereon. Upon degradation of any or all such resultant oxygen linkages, the free constituents, as noted above, exhibit the necessary surfactant-like wetting benefits on a continuous basis. The compounds that meet such a description are broad, and, heretofore, have not been utilized for such soil treatment purposes.

Non-limiting, preferred compounds for this purpose include the following compounds, all of which include the necessary alditol base structure. Basically, surfactant-type compounds are reacted with the free oxygens of the alditol base structure. This can be accomplished in any number of ways, most notably through the alkoxylation of polyfunctional reactive hydrogen-containing materials wherein each reactive hydrogen-containing site include alkylene oxide moieties, such as, for instance, and most preferably, ethylene oxide (EO; a/k/a ethyleneoxy), propylene oxide (PO; a/k/a propyleneoxy), and, to a lesser extent, butylenes oxide (BO; a/k/a butyleneoxy) in a ratio of EO:PO or BO of from 5:95 to 95:5 and the combined molecular weight of EO+PO or BO is from 300 to 20,000, preferably from 500 to 10,000, such that each branch becomes a typical wetting species. As the molecule biodegrades in the soil substructure, preferentially at the polyfunctional starting point as noted above, a new branch of wetter is introduced into the soil for long term performance protection from localized dry spots.

Each of the possible multi-branched wetting agents provides the requisite water transport discussed previously, with the alditol-based types potentially preferred due to ease in manufacture and ease in degrading into constituent parts at a relatively controlled and consistent pace. The soil additive formulation may be entirely comprised of such a wetting agent or agents, in one potentially preferred embodiment, or, the wetting agent(s) may be comprised of from 0.1–99% by weight of such a wetting agent; preferably from 1–99% by weight; more preferably from about 5–95% by weight; more preferably from about 10–90% by weight, with the remainder a mix of possible additives as noted below.

However, in order to best ensure initial penetration of such wetting agents within the target topsoil areas (which may or may not be thoroughly coated with humic substance waxy coatings), it is preferable to include at least one secondary compound within the formulation for further lowering of the surface tension at the topsoil surface which is also compatible with the aforementioned required multi-branched wetting agent. The lowering of the surface tension allows more rapid penetration of the branched wetter into the soil profile. Such a secondary compound can be an alkoxylated (preferably ethoxylated) alcohol (surfactant), such as a branched or unbranched $C_6$–$C_{60}$ alcohol alkoxylate (preferably, again, ethoxylate) (for utilization with the aforementioned multi-branched wetting agent), or alkoxylated (preferably ethoxylated) $C_8$—$C_{40}$ fatty acid (for utilization in combination with the aforementioned multi-branched wetting agent). Such secondary compounds can also be silicone surfactants or fluorosurfactants which are widely known by those skilled in the art to reduce surface tension. Such compounds may be branched or unbranched in configuration. Examples of preferred types of alcohol alkoxylates for this purpose include $C_{6-60}$ alkyl, alkenyl or alkylaryl EO/PO surfactants, linear or branched, and secondary or primary hydroxyl in type, including mixtures of surfactants comprising from 95 to 1% by weight of at least one surfactant selected from polyalkylene oxide compounds with the general formula:

wherein c is 0 to 500; d is 0 to 500, and $R_3$ is H, or an alkyl group with 1 to 4 carbon atoms; wherein the polyalkylene oxide has a molecular weight in the range of 300 to 51,000; and a second optional different surfactant comprising a compound of the general formula:

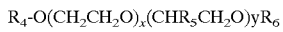

wherein x is from 1 to 50; y is 0–50: $R_4$ is a branched or linear alkyl, alkenyl, aryl or an aryl group optionally having an alkyl group substituent, the alkyl group having up to 60 carbon atoms; $R_5$ is selected from H and alkyl groups having from 1 to 2 carbon atoms; and $R_6$ is selected from H and alkyl groups having from 1 to 30 carbon atoms. Suitable secondary surfactants also include carboxylic and dicarhoxylic esters of the general formula:

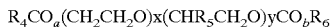

wherein x is from 1 to 50; y is 1–50, a is from 1 to 2, b is from 1 to 2: $R_4$ is an alkyl or alkenyl group having up to 60 carbons or an aryl group optionally having an alkyl group substituent, the alkyl group having up to 60 carbon atoms; $R_5$ is selected from H and alkyl groups having from 1 to 2 carbon atoms; and $R_6$ is selected from H and alkyl groups having from 1 to 30 carbon atoms.

The surface tension of such a surface-active compound (or compounds) should in effect be below the general level of such a humic substance waxy coating, thus less than about 60 dynes/cm$^2$, more preferably less than 40 dynes/cm$^2$. As non-limiting examples for this purpose, tridecyl alcohol (8 EO), and coconut fatty acid (9 EO), are preferred.

In essence, without intending on being bound to any scientific theory, it is believed that the aforementioned copolymer wetting agents provide beneficial properties to the inventive formulations through the binding of the more hydrophobic portions (propylene oxide, or PO, monomers, for example) thereof to the hydrophobic ends of the accumulated humic acids, and the subsequent, or simultaneous, binding of the more hydrophilic portions (ethylene oxide, or EO, for example) to the wetting agents. Such a copolymer component is not necessary for proper functioning of the inventive formulation in every instance, although its presence may be desired in an effort either to increase the penetration of the multi-branched wetting agents or, potentially, to reduce the amount of humic acid removal compounds (which may be expensive or difficult to find in large quantities) within the soil (and/or turf) additive formulation and still provide an effective manner of reducing localized dry spots within the target lawn and/or green. Such a copolymer may thus be of any length and molecular weight with a preferred molecular weight of between 1000 and 15000, more preferably from about 2000 to about 3500, and most preferably from about 2750 to about 3250. Such a copolymer is available from BASF under the family of tradenames of PLURONIC®. If present, such copolymer should be present in an amount of from about 1 to about 85% by weight of the entire formulation, more preferably from about 20 to about 80%, and most preferably from about 55 to about 75%.

Another optional compound for introduction within the inventive formulation is a humic acid removal compound, such as those described in U.S. Pat. No. 6,481,153, to Petrea et al., herein entirely incorporated by reference, as well as certain commercially available products, including, without limitation, CASCADE®, Primer 604 (from Aquatrols), and the like. Most preferred for such a supplemental purpose are succinic acid salts and/or long chain salts and polyfunctional acid salts, as taught within the Petrea et al. patent noted above.

Such an inventive formulation is one example of a soil additive that provides the desired long-term wetting (and potential topsoil humic acid removal) that is necessary to effectuate the reduction in dry spot formation within vegetative areas. As discussed above, the aim of this invention is to lower the surface tension of humic acid accumulations on topsoil by reacting with the hydrophobic extensions of such an acid coating and permitting moisture transport through such a coating for a relatively long period of time on a continuous basis. This result is thus viewed in comparison with other types of soil treatments over at least 4 months straight. Such was performed and delineated and discussed below to show the degree of long-term, consistent, wetting heretofore unavailable to the soil and turf treatment industry.

The inventive formulations may include any other standard components for lawn, garden, or other vegetation treatment, including, further wetting agents, cloud point raising emulsifiers known to those skilled in the art such as polyalkylglucosides, or colorants (for aesthetic purposes or for application identification), perfumes, water, electrolytes, fertilizer, pesticides, growth hormones, minerals, spray pattern indicators, and the like. Preferably, plant and grass nutrients, such as fertilizers, minerals, and/or growth hormones, as well as spray pattern indicators (such as taught within U.S. Pat. No. 5,620,943 to Brendle).

DESCRIPTION OF THE PREFERRED EMBODIMENT

First, test sandy soil samples were taken from each test plot and were characterized by a molarity of ethanol droplet method. First, ethanol standards were made for use in the MED(Molarity of ethanol droplet test) through the production of 1M, 2M, 3M, and 4M solutions of ethanol using absolute 200 proof ethanol. A 15 mm petri dish with one eighth of an inch of the test sand was used for the MED test. Ten drops of distilled water were placed on top of the test sand and a stopwatch was used to record the penetration time. After five minutes, the drops were removed. Ten drops of the one molar ethanol were then placed on the sand and timed (an average of two minutes and 10 seconds). Ten drops of the two molar ethanol were then tested in the same manner (an average of nine seconds). This test required that the drops that last an average of ten seconds be given the numerical value of the molar solution tested.

Then, soil additive formulations were then applied to such sandy soil test plots and tested monthly for such MED penetration times for a 4 month-long period. The additive formulations and their respective ratings based on the MED penetration time results were as follows:

Wetting Agent Compound Production

Initially, certain inventive and comparative wetting agents were produced for inclusion within soil additive formulations, as follows:

EXAMPLE 1

Sorbitol 12 PO (hexa-functional)

858 grams of 70% sorbitol were charged to the reactor. 7.2 grams of KOH flake was then added. The reactor was heated to 230° F. and vacuum stripped until the water was less than 0.1%. The reactor was purged 3×60 psi with nitrogen, heated to 250° F. and 2296.8 grams of PO added. After the addition of PO was complete, the vacuum was applied to the reactor to remove any unreacted oxide.

EXAMPLE 2

Glycerine 12 PO (tri-functional)

350 grams of glycerin was charged to the reactor. 7.5 grams of KOH flake was then added. The reactor was heated to 230° F. and vacuum stripped until the water was less than 0.1%. The reactor was purged 3×60 psi with nitrogen, heated to 250° F. and 2647.8 grams of PO added. After the addition of PO was complete, the vacuum was applied to the reactor to remove any unreacted oxide.

EXAMPLE 3

Propylene Glycol (PPG) 1500 (tri-functional)

500 grams of dipropylene glycol was charged to the reactor. 8.6 grams of KOH flake was then added. The reactor was heated to 230° F. and vacuum stripped until the water was less than 0.1%. The reactor was purged 3×60 psi with nitrogen, heated to 250° F. and 5194 grams of PO added. After the addition of PO was complete, the vacuum was applied to the reactor to remove any unreacted oxide.

EXAMPLE 4

Linear 2000-10 Block (Comparative)

1526 grams of PPG-1500 was charged to the reactor. 3.0 grams of KOH flake was then added. The reactor was heated to 230° F. and vacuum stripped until the water was less than 0.1%. The reactor was purged 3×60 psi with nitrogen, heated to 250° F. and 232.0 grams of PO added. After the addition of PO was complete, 242 grams of EO was added. Vacuum was applied to the reactor to remove any unreacted oxide.

EXAMPLE 5

Linear 2500-20 Block (Comparative)

1526 grams of PPG-1500 was charged to the reactor. 3.7 grams of KOH flake was then added. The reactor was heated to 230° F. and vacuum stripped until the water was less than 0.1%. The reactor was purged 3×60 psi with nitrogen, heated to 250° F. and 232.0 grams of PO added. After the addition of PO was complete, 748 grams of EO was added. Vacuum was applied to the reactor to remove any unreacted oxide.

EXAMPLE 6

Glycerine 5000-20 Block (tri-functional)

788 grams of Glycerine 12PO was charged to the reactor. 12 grams of KOH flake was then added. The reactor was heated to 230° F. and vacuum stripped until the water was less than 0.1%. The reactor was purged 3×60 psi with nitrogen, heated to 250° F. and 3230.4 grams of PO added. After the addition of PO was complete, 981.6 grams of EO was added. Vacuum was applied to the reactor to remove any unreacted oxide.

EXAMPLE 7

Sorbitol 9000-20 Block (hexa-functional)

600 grams of Sorbitol 12PO was charged to the reactor. 8.6 grams of KOH flake was then added. The reactor was heated to 230 F and vacuum stripped until the water was less than 0.1%. The reactor was purged 3×60 psi with nitrogen, heated to 250 F and 3636.5 grams of PO added. After the addition of PO was complete, 1104.6 grams of EO was added. Vacuum was applied to the reactor to remove any unreacted oxide.

In addition, a single humic acid removal compound was produced for testing.

EXAMPLE 8

Amine-based Humic Removal Compound 569.6 grams of water was added to a beaker equipped with a magnetic stir bar. 271.6 grams of DDSA (from Milliken Chemical) and 190.7 grams of Triethanolamine were added to the beaker and heated to 60–70° C.

Soil Additive Formulations

Soil additive formulations were then produced for measurement in terms of reduction of MED penetrations times from the initial plot reading, i.e. before application of formulation to the test plot, until the four month test was complete (all percentages listed below are by weight of the entire formulation):

Formulation 1:

90 parts Sorbitol 9000-20
10 parts SYNFAC ® TDA-92
(Tridecyl alcohol 8EO from Milliken Chemical)

Formulation 2:

300 parts Glycerine 5000-20
40 parts Syn Fac TDA-92
132 parts Example 8

Formulation 3 (Comparative):

18 parts Linear 2000-10
72 parts Linear 2500-20
10 parts Syn Fac TDA-92

Formulation 4 (Comparative):

87 parts FORMULATION 3
33 parts Example 8

These examples, plus the comparatives listed below, were all tested in terms of the above-noted ethanol drop test within the target sandy soils. A lower molarity of ethanol droplet value indicates better wettability and thus moisture penetration to alleviate dry spot localization within lawns, gardens, and the like. A determination of acceptable wetting below indicated a MED significantly lower than an untreated control plot. At day 0, before application of any wetter formulation, the MED of all test plots were essentially the same (MED ~2.4), thus the wetting results were rated as unacceptable. Such measurements were taken in monthly intervals for a 4-month period. The results were as follows:

TABLE

Wetting Capabilities Over Time

| Product | Time After Application (Months) | Wetting Result |
| --- | --- | --- |
| Water (Control) | 0 | Unacceptable |
| Control | 1 | " |
| Control | 2 | " |
| Control | 3 | " |
| Control | 4 | " |
| Formulation 1 | 0 | Unacceptable |
| Formulation 1 | 1 | Acceptable |
| Formulation 1 | 2 | " |
| Formulation 1 | 3 | " |
| Formulation 1 | 4 | " |
| Formulation 2 | 0 | Unacceptable |
| Formulation 2 | 1 | Acceptable |
| Formulation 2 | 2 | " |
| Formulation 2 | 3 | " |
| Formulation 2 | 4 | " |
| Formulation 3 (Comparative) | 0 | Unacceptable |
| Formulation 3 | 1 | Acceptable |
| Formulation 3 | 2 | " |
| Formulation 3 | 3 | Unacceptable |
| Formulation 3 | 4 | " |
| Formulation 4 (Comparative) | 0 | " |
| Formulation 4 | 1 | Acceptable |
| Formulation 4 | 2 | " |
| Formulation 4 | 3 | Unacceptable |
| Formulation 4 | 4 | " |
| CASCADE ®[1] (Comparative) | 0 | " |
| Cascade | 1 | Acceptable |
| Cascade | 2 | " |
| Cascade | 3 | Unacceptable |
| Cascade | 4 | " |

[1]Cascade ® - Competitive sample from Precision Labs

Thus, the inventive multi-branched formulations 1 and 2 clearly showed extremely good long-term wetting properties for effective dry spot alleviation, particularly with the hexa-branched wetting agents in Formulation 1 showing better long-term wetting than the inventive tri-branched wetting agents of Formulation 2, with both clearly better in such long-term properties than the linear types in the remaining Formulations. The inventive multi-branched formulations 1 and 2 clearly showed extremely good long-term wetting properties for effective dry spot alleviation as compared to their linear counterparts formulations 3 and 4, as well as the comparative commercial formulation Cascade. While both formulations 1 and 2 were rated acceptable after 4 months, the measured MED's for each after that time interval were 0.6 and 1.3 respectively, which clearly substantiate the improved performance of the inventive hexa-branched wetting formulation over the inventive tri-branched formulation.

There are, of course, many alternative embodiments and modifications of the present invention which are intended to be included within the spirit and scope of the following claims.

What we claim is:

1. A method of reducing localized dry spot formation within lawns or greens comprising the application of a soil additive formulation to a target lawn or green, comprises a multi-branched wetting agent having an oxygen-containing polyfunctional base compound and at least three surfactant branches attached thereto, wherein each surfactant branch includes both hydrophilic and hydrophobic constituents, and from 0–99% by weight of at least one secondary compound that further actively lowers the surface tension of humic acid waxy coatings from hydrophobic sand particles, and optionally at least one component selected from the group consisting of a plant nutrient, a spray pattern indicator, and any mixtures thereof.

2. The method of claim 1 wherein the oxygen-containing polyfunctional base compound is selecting from the group consisting of a polyol, a polycarboxylic acid, and a lactone.

3. The method of claim 2 wherein said base compound is a polyol.

4. The method of claim 3 wherein said polyol is selected from the group consisting of sorbitol, xylitol, mannitol, pentaertythritol, sucrose, saccharose, galactose, leucrose, fructose, mannose, glucose, and glycerol.

5. The method of claim 4 wherein said polyol is sorbitol.

6. The method of claim 4 wherein said polyol is glycerine.

7. The method of claim 1 comprising at least one other compound, other than said multi-branched wetting agent, that actively lowers the surface tension of humic acid waxy coatings from hydrophobic sand particles comprises at least one copolymer component exhibiting both hydrophilic and hydrophobic monomers.

8. The method of claim 7 comprising at least one humic acid removal compound.

9. The method of claim 1 wherein said soil additive formulation is present in the form selected from the group consisting of a liquid, a pellet, and a grain.

10. The method of claim 7 wherein said soil additive formulation is present in the form selected from the group consisting of a liquid, a pellet, and a grain.

11. The method of claim 8 wherein said soil additive formulation is present in the form selected from the group consisting of a liquid, a pellet, and a grain.

* * * * *